United States Patent [19]
Barker

[11] Patent Number: 4,886,990
[45] Date of Patent: Dec. 12, 1989

[54] REVERSING PSC MOTOR DESIGN CAPABLE OF HIGH REVERSAL REPTITION RATE

[75] Inventor: Alan R. Barker, St. Charles, Mo.

[73] Assignee: Emerson Electric Co., St. Louis, Mo.

[21] Appl. No.: 227,146

[22] Filed: Aug. 2, 1988

[51] Int. Cl.⁴ .......................... H02K 3/00; D06F 13/02
[52] U.S. Cl. .................................... 310/184; 310/172; 310/254; 68/134
[58] Field of Search ............... 310/172, 180, 184, 254; 68/133, 134

[56] References Cited
U.S. PATENT DOCUMENTS 4,100,444  7/1978  Boyd, Jr. ............................ 310/184
4,779,431  10/1988  Burk et al. ........................ 68/134 X Primary Examiner—Patrick R. Salce
Assistant Examiner—Emanuel Todd Voeltz
Attorney, Agent, or Firm—Polster, Polster and Lucchesi

[57] ABSTRACT

A reversible permanent split capacitor (PSC) motor and method of designing such a motor employs a parallelogram lamination silhouette and distributes the winding in the core of the motor stator assembly so that maximum flux density in the core is approximately equal in each direction of motor rotation. The motor is designed to achieve high repetition reversal rates. The reversal rate and the equal performance attained in each direction, makes the design particularly suitable for washing machine applications.

24 Claims, 10 Drawing Sheets

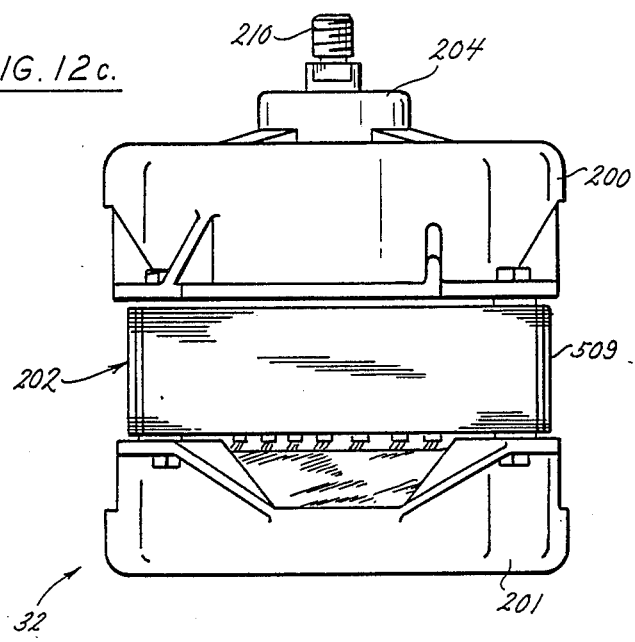
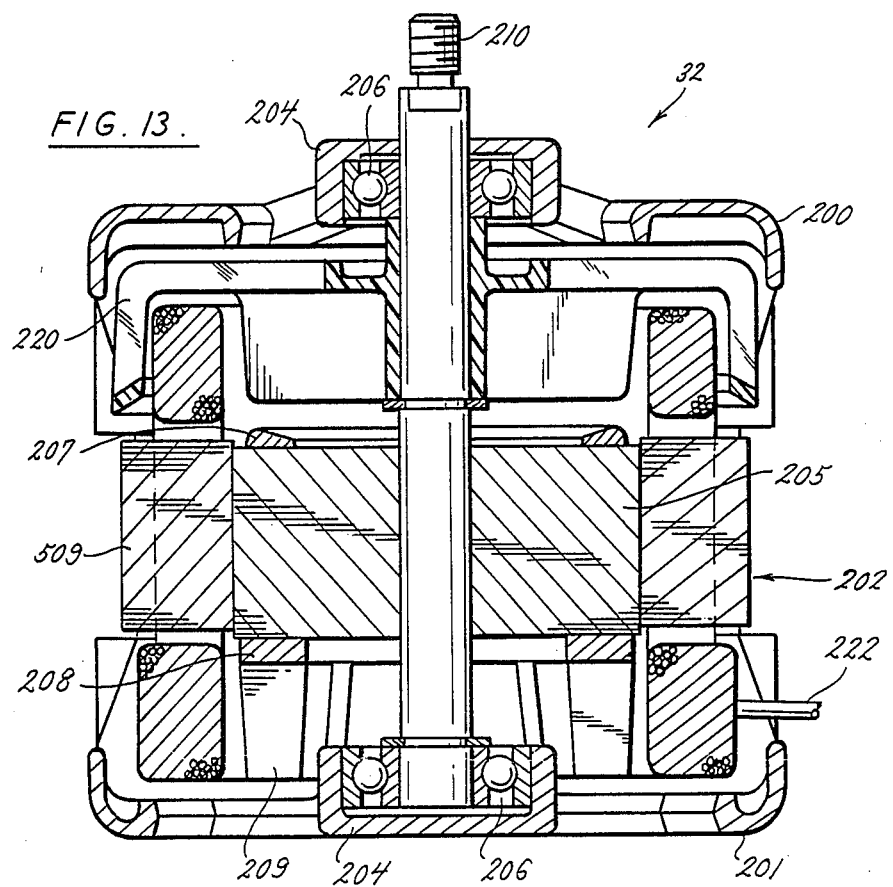

REVERSING PSC MOTOR DESIGN CAPABLE OF HIGH REVERSAL REPTITION RATE

BACKGROUND OF THE INVENTION

This invention relates to a reversing permanent split capacitor (PSC) motor design, and in particular, to a reversing PSC motor finding application in a drive system for an agitator of an automatic washing machine. While the invention is described with particular detail in respect to such application, those skilled in the art will recognize the wider applicability of the inventive principles disclosed hereinafter.

PSC motors have been used to drive washing machines for a long time. The motors themselves have been known since nearly the birth of induction motors.

Likewise, washing machines are not new. Over the years, many attempts have been made to simplify drive mechanisms employed to drive the agitator and spin wash basket of automatic washers. Many motor types have been employed for this purpose, including both induction motors and direct current motors of various constructions. More recently, brushless permanent magnet motors, and electronically controlled motors having unusual winding configurations in the form of winding stages have been suggested for use in washing machines. See for example, the U.S. Pat. No. 4,390,826 to Erdman et al. Motors having winding stages are expensive to manufacture and difficult to control. That is to say, they require expensive and sophisticated electronic control circuitry for operation. While conventional brushless permanent magnet motors employing conventional windings, as opposed to the stages used in the Erdman patent, for example, have long been suggested for washing machine applications, they too require relatively complicated control circuitry for operation.

The motor and method of the design disclosed hereinafter utilizes a specifically designed reversible split capacitor motor capable of reversing 120 times a minute to provide the agitation motion for a washing machine. In order to achieve this high reversability, numerous design criteria needed to be met. The criteria to my knowledge, could not be met with conventionally constructed PSC motors.

With respect to any PSC motor where reversing is important, rotor inertia must be kept as low as possible so that the rotor does not develop a tendency to "fly wheel" in the initial direction of rotation instead of reversing as required by the application. The motor also must not have third quadrant torque. This means that when running in a negative speed mode, the motor must not develop any negative torque. If negative torque is developed during operation, the motor may not reverse upon reversal of the power connections. Most importantly, the motor must provide equivalent electrical and mechanical output in both directions. The washing machine performance characteristic necessarily depends on essentially equivalent motor output in each direction of rotation to enable the washing machine to deliver equal washing motions in each direction of motor rotation.

As can be appreciated, the most relevant factor in determining the rotor's inertia is rotor weight. Rotor weight is directly related to its overall diameter. However, if rotor diameter is too small, then the motor is incapable of developing sufficient torque in various drive applications in general and in a washing matching application in particular. On the other hand, if a large bore or diameter design is employed, fourth quadrant torque to overcome inertia is difficult to attain. Under conventional motor design criteria, the motor secondary resistance, that is to say, the resistance of the rotor, is chosen so that it is less than or equal to total stator impedance. The design of the motor described hereinafter employs a high resistance rotor. The secondary resistance, i.e. the resistance of the rotor in the preferred embodiment is approximately 1.4 times the impedance of the stator. In any case, acceptable resistances are in a range between 1.25 to 1.55 times the impedance of the stator. The motor construction described hereinafter achieves certain design criteria not met with conventional techniques. First, it enables the locked rotor torque in each direction of motor rotation to remain high, i.e. approximately 60% of breakdown torque. It also insures that no third quadrant torque will be produced. I have found that when reversible PSC motors designs deviate from these ratios, the result is a motor design that either costs too much, or fails to meet the instant reversability or peak torque requirements of the particular application.

The conventional method for manufacturing a four pole reversing PSC motor is to employ two windings having equal turn counts and wire sizes for the motor stator. The windings then are placed at 90 electrical degrees (45 mechanical degrees) apart in a suitable stator core lamination design. A capacitor is placed between the two windings, and power is applied to one side or the other of the winding/capacitor configuration. Functional use of each winding depends upon which side of the capacitor has power applied to it. With one connection method, the first winding acts as the motor main winding and the second winding acts an auxiliary winding. On reversal, the winding functional aspects also are reversed. Equal winding turns means that the turns ratio or K ratio of the windings, conventionally defined as the number of auxiliary winding effective turns divided by the number of main winding effective turns, is one.

An alternative to the K ratio of one design is disclosed hereinafter, denominated as an open delta connection. In the open delta design, a stator is wound with three windings displaced by 60 electrical degrees. Typically all three windings have the same turn counts and wire sizes. In one direction, one of the windings acts as the main while the combination of the other two windings and capacitor serve as the auxiliary. In the reverse direction the third winding acts as the main while the remaining two windings and capacitor serve as the auxiliary winding. The resulting K ratio in this design is 1.732. Because the K ratio is larger than one, a smaller capacitor can be used in the open delta design than in the equal turns ratio arrangement. Total motor cost may be lower because of the ability to use the smaller capacitor.

In general, it is more cost effective to design stator laminations having silhouettes either in square or in other parallelogram shapes. From a manufacturing standpoint, these shapes can be manufactured with less scrap in the lamination manufacturing operation. I have found that with a square lamination design, it is important that the lamination be designed and the winding placement chosen so that each winding controls approximately identical amounts of amination material, so that electrical performance is equal in each direction of motor operation. When designed according to the principles disclosed herein, a low cost, highly efficient, small size and easy to manufacture motor particularly suitable to act in the drive system of a washing machine is the result.

One of the objects of this invention is to provide a low cost reversing PSC motor design.

Another object of this invention is to provide a low cost PSC motor design having applicability in a drive system for a washing machine.

Another object of this invention is to provide a reversible PSC motor having a high resistance rotor design so that no third quadrant torque develops during normal motor operation.

Still another object of this invention is to provide a reversing PSC motor which includes at least a square or other generally parallelogram shape for the lamination silhouette.

Yet another object of this invention is to provide a lamination design having winding receiving slots formed in the laminations, the number and arrangement of which, in combination with the motor winding placement, is adapted to provide equal maximum flux densities in each direction of motor rotation.

Still another object of this invention is to provide a reversing PSC motor that obtains higher rates of reversal and superior motor performance in applicational use than reversing PSC motors heretofor known.

Other objects of this invention will be apparent in view of the following description and accompanying drawings.

SUMMARY OF THE INVENTION

In accordance with this invention, generally stated, a reversible permanent split capacitor motor is disclosed which uses a generally parallelogram lamination design. Individual laminations have a central opening and a plurality of radially extending closed bottom receptacles communicating with the central opening formed in them. Adjacent receptacles delimit a lamination tooth, and the inwardly radially directed extensions of the teeth define the central opening.

When formed in a core comprising a plurality of laminations, the receptacles delimit winding receiving slots and the central opening defines a rotor receiving bore. The lamination preferably has two axis of symmetry, and the slots are arranged so that each symmetrical axis passes through winding receiving slot openings. The windings of the motor are distributed in the slots so that maximum flux density for the core is approximately equal in each direction of rotation. Preferably, the rotor design has high resistance, and the combination of rotor inertia and rotor resistance is chosen so that (i) no third quarter torque exists and (ii) locked rotor torque always will enable the motor to start in either direction.

BRIEF DESCRIPTION OF THE DRAWINGS

In the drawings.

FIG. 9b is a phasor diagram illustrating the operation of the motor shown in FIG. 8b and 9a;

FIG. 12c is a view in side elevation of the motor of this invention; and

FIG. 13 is an enlarged sectional view of the motor of this invention.

DESCRIPTION OF THE PREFERRED EMBODIMENT

Figure 1:
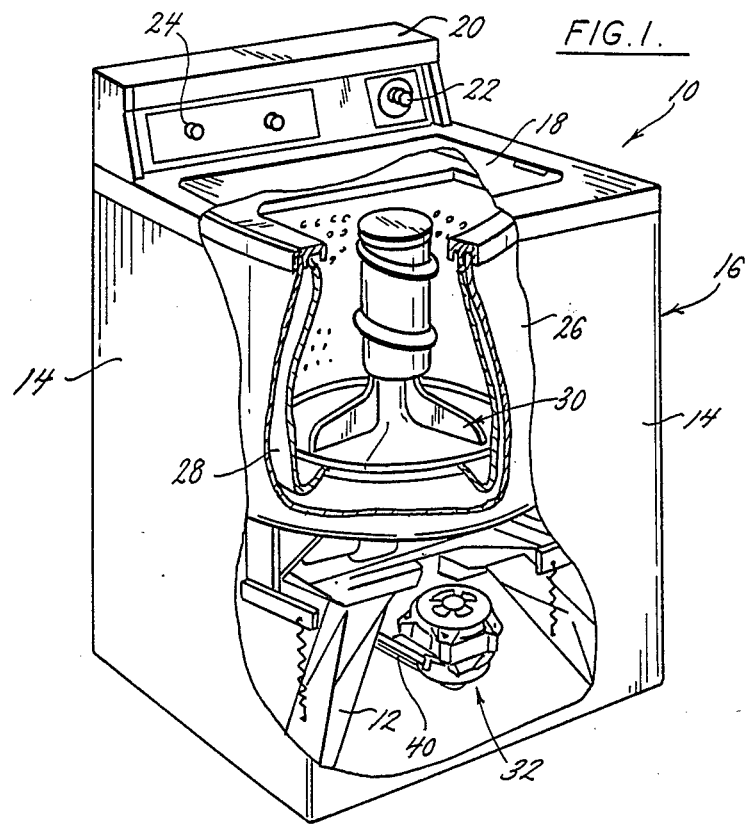
FIG. 1 is a view in perspective partially broken away, depicting an automatic washing machine utilizing the motor of the present invention.

Referring now to the FIG. 1, reference numeral 10 indicates generally a vertical axis agitator type washing machine having preselectable controls for automatically operating the machine through a programmed series of washing, rinsing and spinning steps. The machine 10 includes a frame 12 carrying panels 14 forming the sides, top, front and back of a cabinet 16. A hinged lid 18 is provided in the usual manner for access to the interior of the washing machine 10. In the embodiment illustrated, the washing machine 10 has a rear console 20 in which is disposed setable control means, including a timer dial 22 and a temperature selector 24. Other controls may be provided, if desired.

Internal to the washing machine 10 there is disposed a perforated fluid containing tub 26 within which is rotatably mounted a perforated basket 28 for rotation about a vertical axis. A vertically disposed agitator 30 is connected for operation to a motor 32 through a drive mechanism 34.

Figure 2:
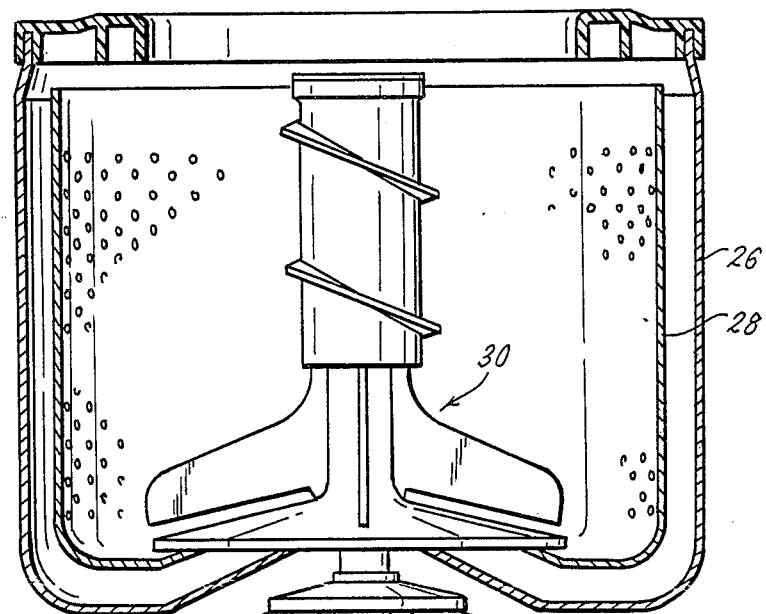
FIG. 2 is a cross sectional view of a portion of the automatic washer shown in FIG. 1.
Figure 2:
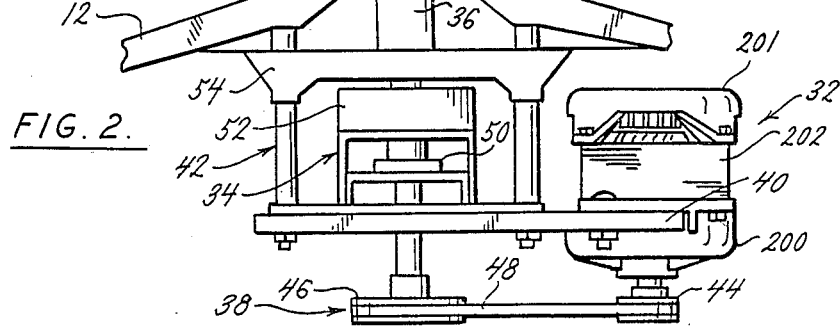
Figure 3:
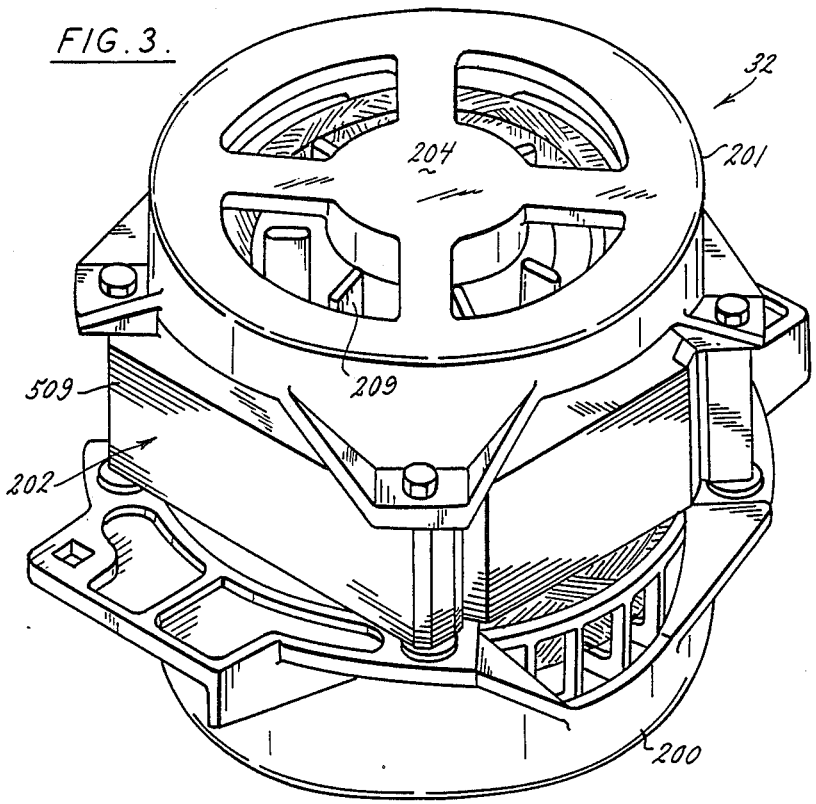
FIG. 3 is a view in perspective of the motor employed in connection with the washing machine of FIG. 1.

Referring to FIG. 2, the agitator 30 is linked by a shaft 36 to the drive 34, which, in turn, is driven by a suitable pulley arrangement 38 connected to the motor 32. The motor 32 is mounted in an arrangement 40 and 42 which connects to the frame 12 of the washer 10. As indicted, the motor 32 is linked to the pulley arrangement 38, that arrangement including a drive pulley 44 and a driven pulley 46 connected by the belt 48 to a drive 34. The drive 34, in the embodiment illustrated, also includes a planetary gear drive having a spring clutch 50 in a planetary housing 52 mounted in a reduction drive frame 54 that connects to the frame 12. While a planetary reduction drive has been shown in the drawings and disclosed herein for use with the motor 32 of the present invention, those skilled of the art will recognize that a variety of other driver arrangements can be utilized with the motor 32. It is also contemplated that the motor 32 may be directly attached to the agitator in operation of the washing machine 10. As will be appreciated by those skilled in the art, the washing machine 10 being described here for background information and detail, may comprise any of a variety of commercially available devices.

Figure 12A:
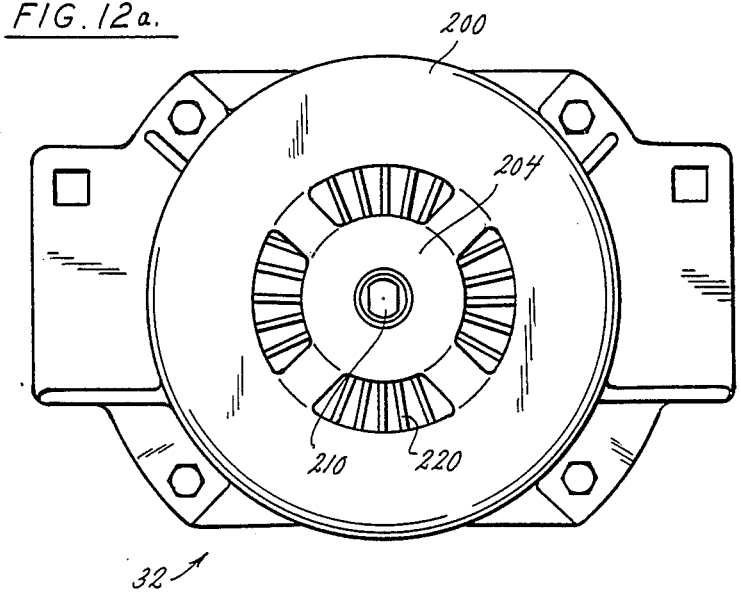
FIG. 12a is an end view of one illustrative embodiment of the motor of this invention.
Figure 12B:
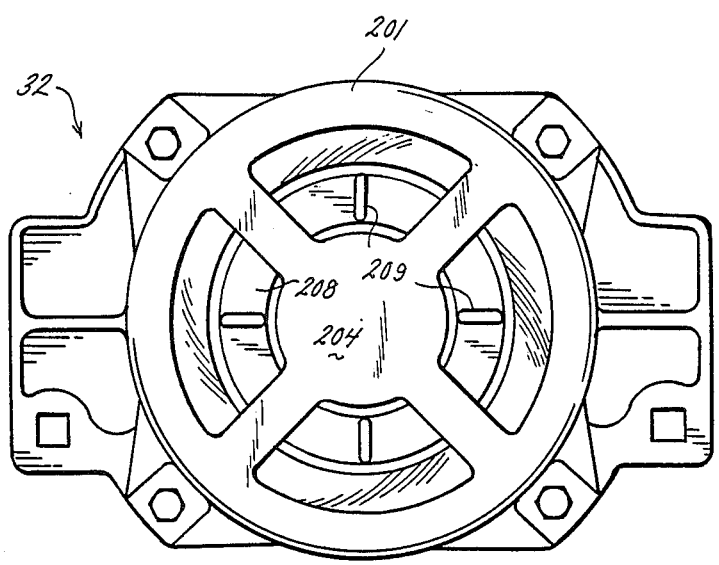
FIG. 12b is a second end view of the motor of this invention.

The motor 32, as shown in FIGS. 12 and 13, includes a first end shield 200 and a second end shield 201 which are attached to a stator assembly 202 in any conventional manner. Threaded fasteners work well, for example. The end shields 200 and 201 respectively include a central hub 204 which houses suitable bearings 206 for rotatably supporting a rotor assembly 205. The rotor assembly 205 is mounted to a shaft 210. The shaft 210, in turn, is journaled in the bearings 206, which, as indicated, are positioned the respective hubs 204. The rotor assembly 205 is mounted on the shaft 210 by any convenient method. Shrink or press fits work well, for example. The attachment of the motor 32 to the washing machine 10 is described in particular detail in a copending application Ser. No. 227,162, filed Aug. 2, 1988, the disclosure of which is incorporated herein by reference. Likewise, certain related constructional features of the motor 32, not forming a part of the invention disclosed herein are described in a copending application Ser. No. 227,164 filed, Aug. 2, 1988. The disclosures of these related applications are intended to be incorporated by reference herein.

The rotor assembly 205 preferably is a laminated structure having a squirrel cage design. The assembly 205 includes end rings 207 and 208. In the embodiment illustrated, the end ring 208 has an integrally cast fan 209 formed with it, for purposes of cooling the motor. A fan assembly 220 also is provided on the opposite rotor end for rotation with the shaft 210 for the purposes of additional cooling of the motor 32. Details of the cooling functions and construction of the fan assembly 220 may be found in copending application Ser. No. 227,145 filed Aug. 2, 1988, the disclosure of which is intended to be incorporated by reference. Power is supplied to the motor through conventional lead wires 222 which may be terminated in any suitable way. Conventional connector plugs work well, for example.

Figure 8A:
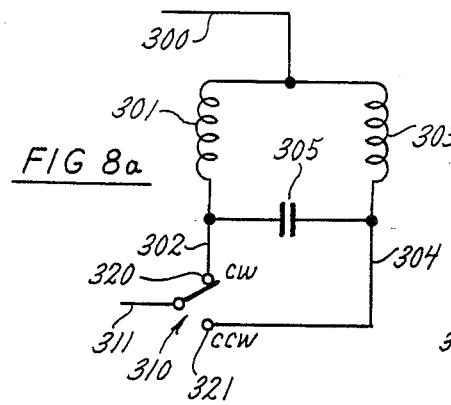
FIG. 8a is a diagrammatic view of a K ratio equal to one design for a first illustrative embodiment of motor of this invention.
Figure 8B:
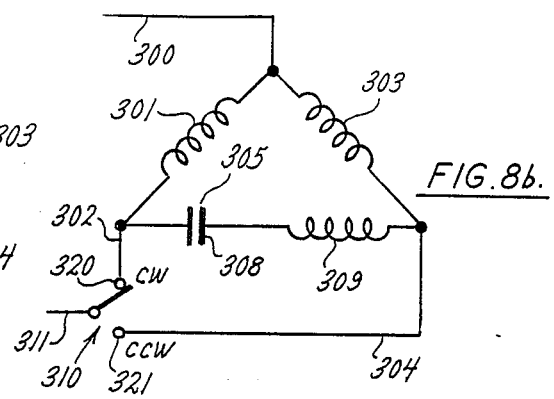
FIG. 8b is a diagrammatic view of an open delta design for a second illustrative embodiment of motor of this invention.

As indicated above, electrically the motor 32 may take two forms. Equivalent circuits for the motor windings are shown in FIGS. 8a and 8b. As shown in FIG. 8a, the equal K ratio design, a lead wire 300 is connected to one side of a first winding 301. A second side of winding 301 is connected to a lead 302. The lead 300 also is connected to a first side of a winding 303. A second side of the winding 303 is connected to a lead 304. A capacitor 305 is connected between the leads 302 and 304. A switch means 310 is provided to connect an input conductor or line 311 either to the lead 302 or the lead 304, depending upon the direction of rotation desired.

The open delta design is shown in FIG. 8b. Like reference numerals are employed, where appropriate. In the embodiment shown, the input lead 300 again is connected to one side of the winding 301 and the winding 303. The second side of winding 301 is connected to the conductor or lead 302 and the capacitor 305. A second side 308 of the capacitor 305 is connected to a first side of a third winding 309. A second side of winding 309 is connected to the lead 304 and to a second side of the winding 303. The leads 302 and 304 again are connected to the switch means 310 and through the switch means to the other input power conductor 311. Movement of the switch means 310 between either a terminal 320 or a terminal 321 will cause alternate rotation of the rotor in either a clockwise or a counter-clockwise direction, respectively.

The circuit design in FIG. 8a is a somewhat more conventional method of producing a reversing PSC type motor. For example, in the embodiment of FIG. 8a, the windings 301 and 303 preferably have the same wire sizes and turn count. Those skilled in the will appreciate that the windings 301 and 303 comprise a number of poles. That is to say, the winding 301 may be constructed from any desired number of poles. The number of poles determines the maximum operating motor speed and for most washing machine applications, 2, 4, 6 and 8 pole configurations are found to be adequate. Other variations will be apparent to those skilled in the art. As indicated above, the drawings indicate a four pole configuration.

In FIG. 8b, each of the windings 301, 303 and 309 preferably have the same turn counts and wire sizes. In one direction of rotation, winding 301 will act as the main while the combination of windings 303 and 309 serve as the auxiliary winding. In the other direction of rotation, winding 303 acts as the main winding, while windings 301 and 309 serve as the auxiliary winding. Again, the individual windings may be wound in a variety of pole configurations.

As previously indicated, the largest single factor in determining a rotors inertia is its weight. Rotor weight is directly related to its outer diameter. For the washing machine application described herein, the optimum stator bore diameter was derived to be at 70 mm or 2.756 inches. The outer diameter dimension for the stator lamination was chosen at approximately 4.2 inches. This combination of size factors enables the motor of my invention to have the lowest material cost for the performance required in the washing machine application described.

Figure 4:
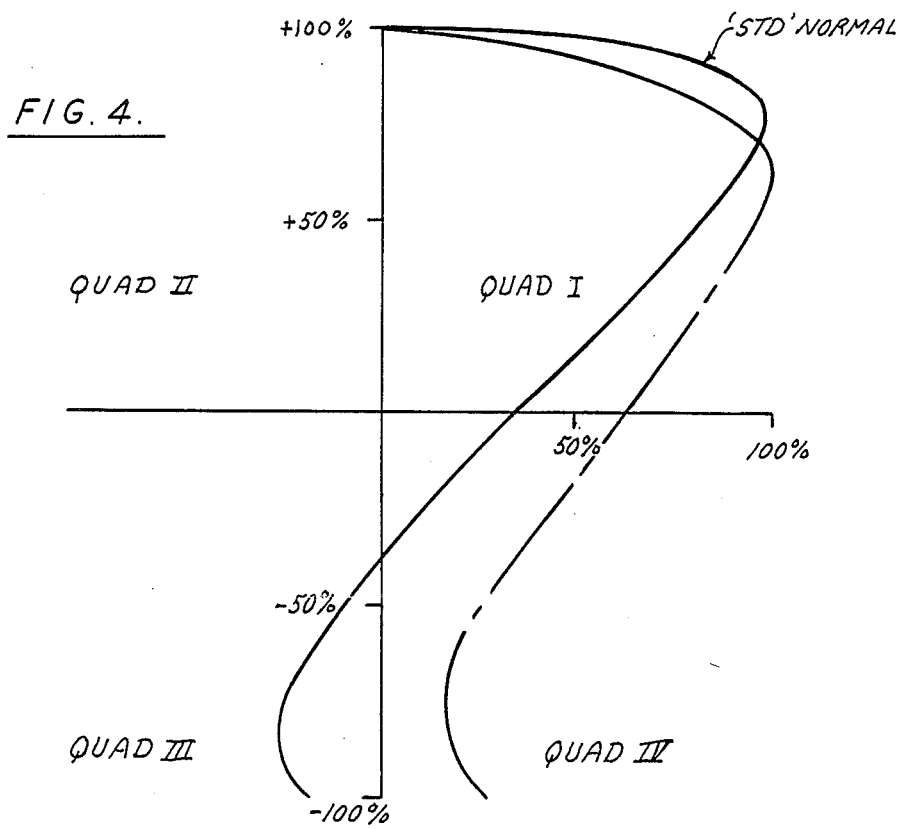
FIG. 4 is a speed torque curve representation of the motor design of the present invention as compared with a conventional reversible split capacitor motor.

FIG. 4 is a speed torque curve for the conventional reversing PSC motor design sometimes used in washing machine applications. As shown in FIG. 4, with conventional or standard (STD) motor designs, third quarter torque can have a negative value. This is highly undesirable in situations where a large number of reversals per minute for the motor are required. Indeed, this condition is not desirable in applications requiring any number of reversals. By following the design criteria set forth herein, the second speed torque characteristic shown in FIG. 4 was obtained. Significantly, no third quarter torque is present in the design; high locked rotor torque or starting torque is obtained; breakdown torque is equivalent to the standard motor; and the operating range of the motor on the speed torque curve is roughly equivalent. More importantly, the operational performance can be repeated in either direction of rotation.

Figures 5A, 5B:
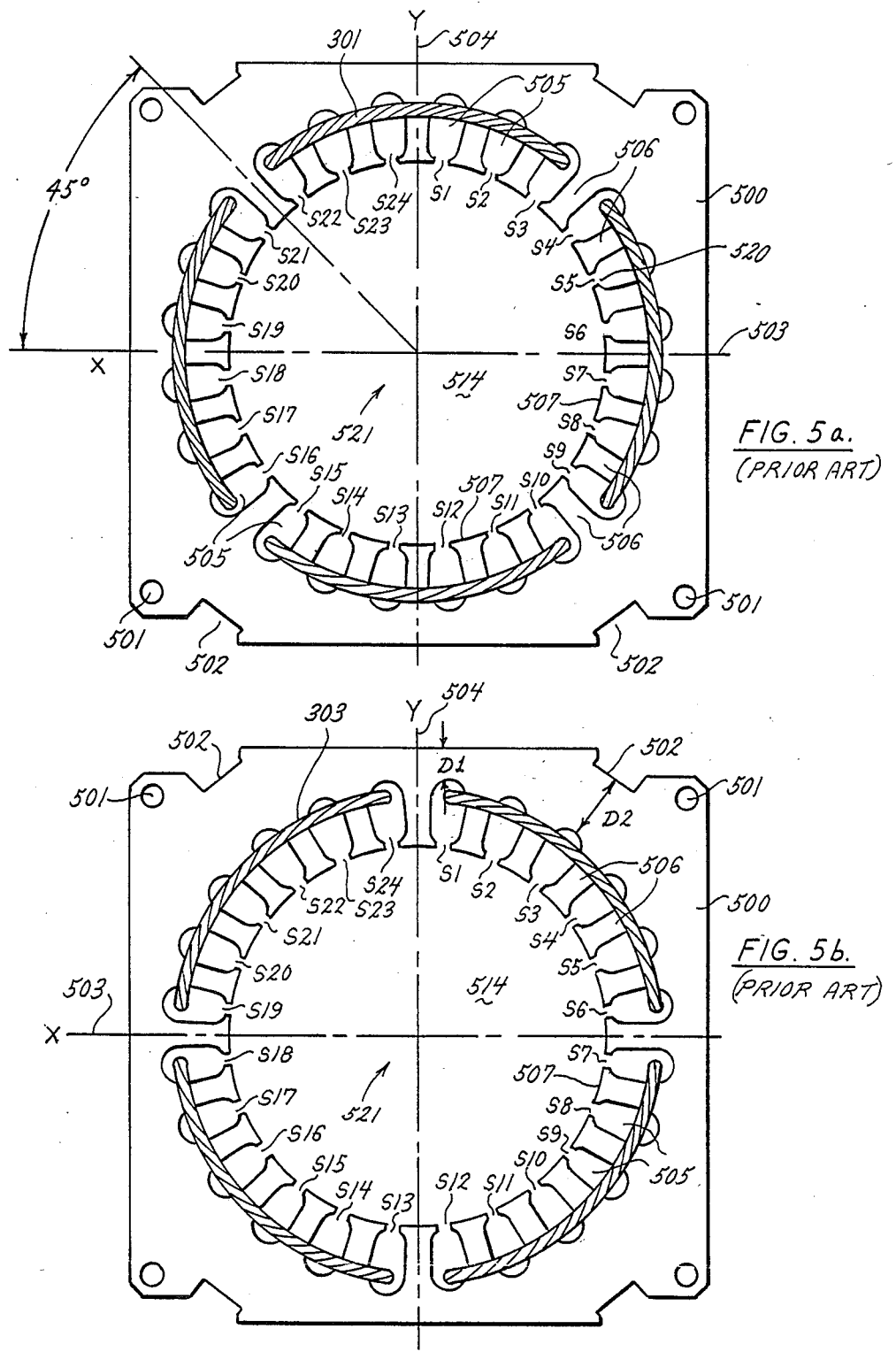
FIG. 5a is a diagrammatic view, labeled prior art, showing a first conventional winding for a reversible PSC motor acting as a main winding in one direction of rotation, illustrating a first yoke area of maximum flux density.
FIG. 5b is a diagrammatic view showing a second conventional winding for a reversible PSC motor acting as a main winding in a second direction of rotation, illustrating a second yoke area of maximum flux density, the first and second yoke areas being substantially different from one another.

FIGS. 5a and 5b show conventional winding and slot configurations in known reversing PSC motors. For purposes of description, a lamination 500, which is a generally a parallelogram shape, is shown in a known winding and slot design. The parallelogram shape found most convenient to use is a square. The lamination 500 includes certain constructional details not forming part of the present invention in the form of mounting bolt openings 501 adjacent a plurality of cleat notches 502. The cleat notches 502 are utilized to interlock the laminations in a predetermined core height as is known in the art. The lamination 500 has, for purposes of describing the present invention, four peripheral flat or edge surfaces arranged in the parallelogram shape with an X axis of symmetry 503 and a Y axis of symmetry 504 along the flat or edge surfaces, as referenced to FIG. 5a. As there shown, each lamination 500 has a central bore opening 514. The opening 514 has a plurality of radially extending close bottom receptacles 505 communicating with the central opening 514. Adjacent receptacles 505 define teeth 506 having tips 507, the inwardly extending ends of which define the opening 514.

In their assembled relationship, the individual laminations 500, delimit a core 509 (shown in FIG. 13), while the receptacles 505 delimit winding receiving slots 520. The central opening 514 defines a rotor receiving bore 521. In the embodiment illustrated, there are twenty-four (24) slots 520, which are numbered for description in a clockwise direction, as referred to in FIGS. 5a and 5b, by the notations S1 through S24. Conventionally in prior art designs, one tooth 506 lies along each respective one of the axes of symmetry 503 and 504. As can be seen in FIG. 5, the number of teeth equal the number of slots and each tooth centerline axis represents 15° of a conventional compass measurement.

FIGS. 5a and 5b illustrate diagrammatically the respective windings 301 and 303 acting as main windings. Conventionally, during motor construction one of the windings is placed in the slots first, and the second winding is placed radially inwardly of the first winding, and the winding may share slots with one another. For ease of description, however, the windings 301 and 303 are shown separately in FIGS. 5a and 5b.

Maximum flux density in the lamination 500 occurs in the areas where the respective windings are split, as between the slot S3 and S4 in FIG. 5a and slot S24 and S1 in FIG. 5b. Flux density is determined by first deriving the total motor flux $\phi$ from the formula:

$$\phi = \frac{V_{RMS}(4.54 \times 10^4)(.95)}{(f)(CK_W)}$$

Where $V_{RMS}$ = the root mean square value of the terminal voltage applied to the motor;
 f = frequency of the voltage source;
 $CK_W$ = Total number of effective conductors of the motor; where C is the total actual motor turns and $K_W$ is a winding factor to obtain effective turns.

Flux is expressed in K lines. Once total flux is determined Flux density is determined from the formula:
 Flux Density = $\phi/A$ Where A = the cross-sectional area of the core structure of concern. Generally, the "tooth" density and core density are calculated. For the core structure, flux density is determined in practice by the distance between the slot bottom, times the core stack height. RMS values of flux density are obtained by dividing the flux density obtained from the above calculation by the square root of 2.

Assuming other factors being equal, flux density depends, in the lamination design shown in FIGS. 5a and 5b, on the distance between the slot bottoms and any particular end point of the lamination 500. As can be seen in FIG. 5b, the distance D1 is substantially smaller than the distance D2, so that the prior art motor depicted in FIGS. 5a and 5b cannot possibly have equivalent performance in each direction of rotation. Since motor electrical performance decreases as flux density increases, motor operation in the FIG. 5b arrangement is demonstratably worse than in the FIG. 5a mode of operation.

Figure 6A:
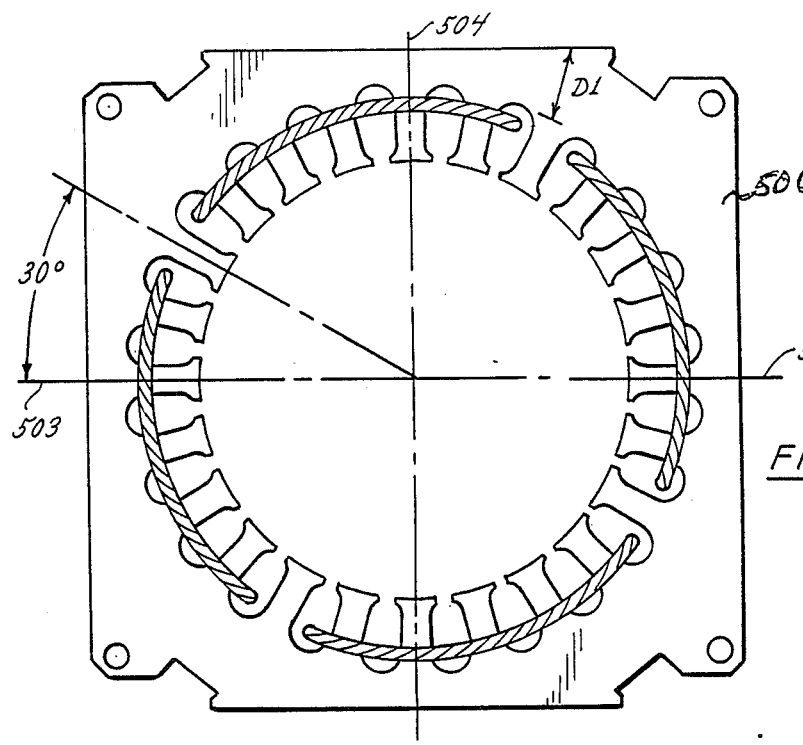
FIGS. 6a and 6b are diagrammatic views showing first and second axes of symmetry for the lamination, further illustrating respective first (FIG. 6a) and second (FIG. 6b) windings of the motor of FIG. 5 shifted 15° respectively, also illustrating first ($D_1$) and second ($D_2$) yoke portions of maximum flux density for the laminations there illustrated.
Figure 6B:
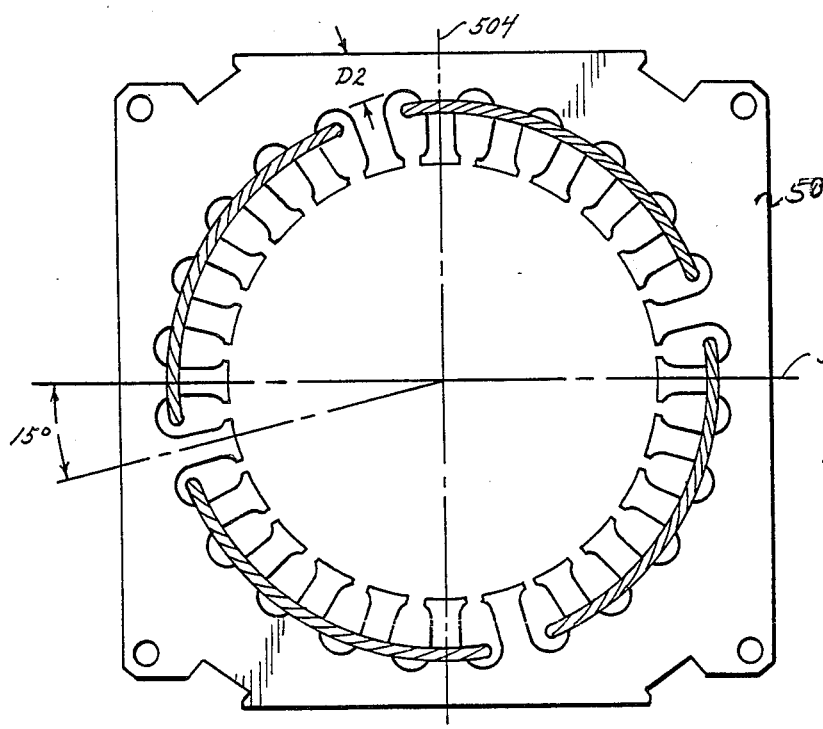

FIGS. 6a and 6b depict a conventional way to improve motor performance. Where the motor is intended to operate in a single direction, performance improvement sometimes can be accomplished by shifting the winding one slot in either direction from the associated symmetry axis. When this is done with a reversible motor, however, performance in both directions of rotation does not improve. As can again be seen, the distance D1 in FIG. 6a, while increased with the shifted winding, is still substantially different from the distance D2 shown in FIG. 6b. Again, motor performance will not approach equivalency in each direction of motor rotation.

Figure 7A:
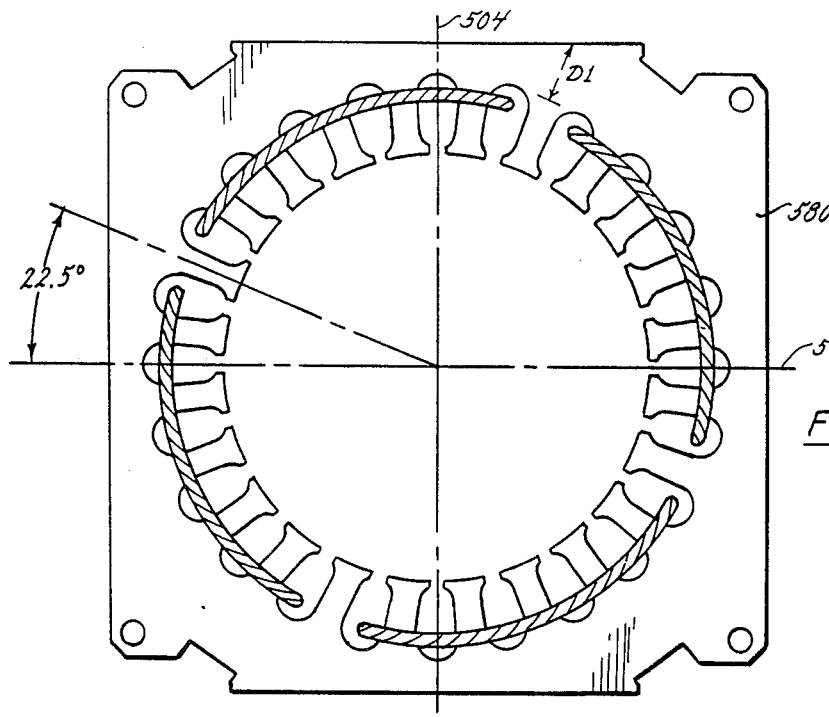
FIGS. 7a and 7b are diagrammatic views of the lamination design of the present invention for a K ratio of one design in which the axes of symmetry of the lamination are chosen to extend through a winding receiving receptacle or slot, the windings being positioned in the slots so that the area of maximum flux density (D) (represented by $D_1$ and $D_2$) is the same in each direction of rotation.
Figure 7B:
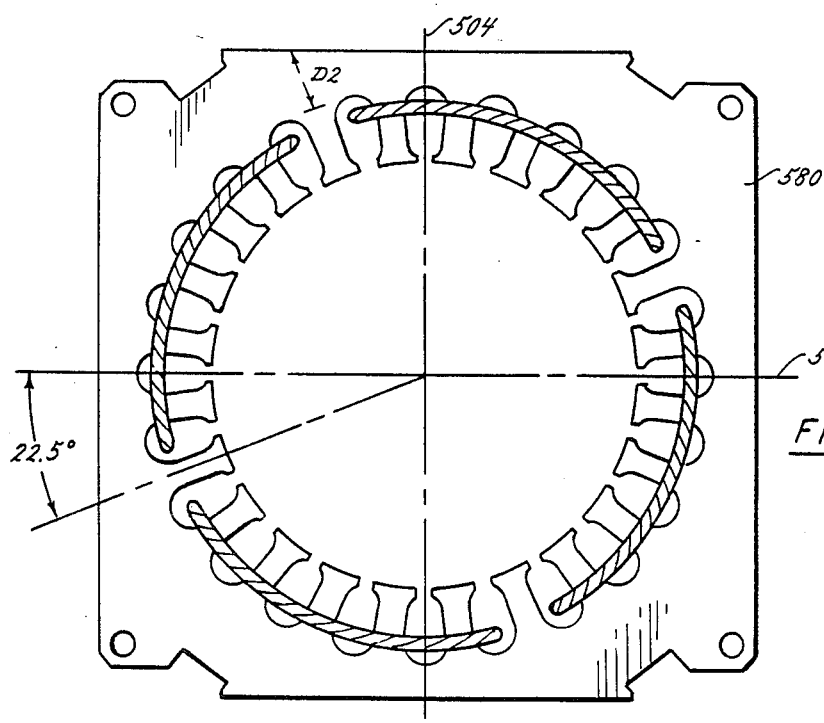

FIGS. 7a and 7b illustrate the final configuration for a lamination 580 used for the motor 32. Like numerals are employed, where appropriate. As there shown, the lamination design itself has been rearranged so that the axes 503 and 504 now pass through a slot of the lamination rather than a tooth. When so arranged, each winding split occurs 22.5° from the one of the axes of symmetry 503 and 504, regardless of which winding is utilized as the main winding. Consequently, maximum flux density of necessity is the same in each direction of rotation and equivalent modes of electrical performance, and consequently equal washing performance, is obtained. Equivalent performance occurs regardless of the time spent in either direction of rotation during washing operation.

Figure 9A:
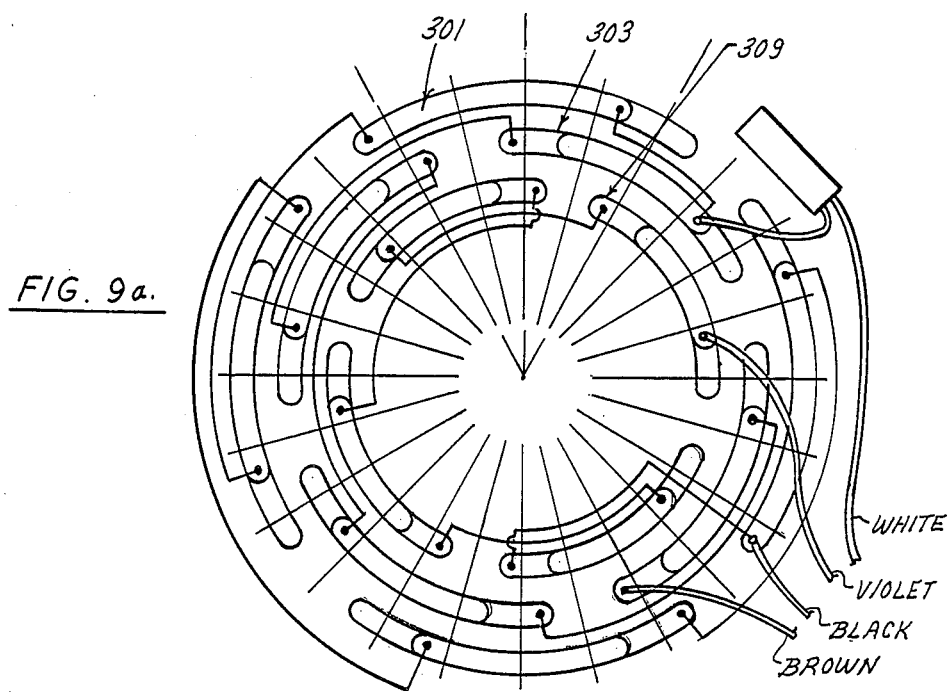
FIG. 9a is a diagrammatic view of a connection diagram for the motor shown in FIG. 8b.

FIG. 9a is a connection diagram for the open delta design described above. Again, each winding comprises four poles, each pole having two sets of wire turns forming the pole. The radially extending lines represent tooth axes, and the wire turn sets are wound to span three and five teeth, respectively. The winding configuration and coil placement are diagrammatically illustrated in FIG. 9a. Also shown in 9a are the connections between poles, the leads, and a protector employed with the motor 32 of this invention, regardless of the winding configuration used.

Figure 9B:
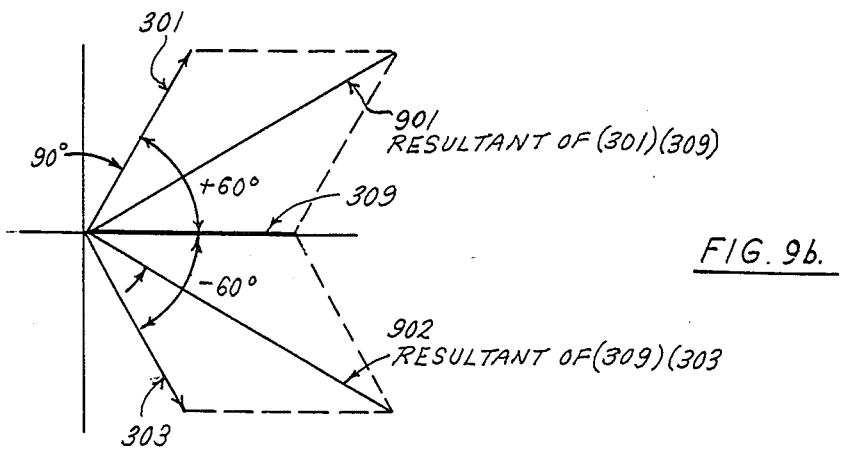

FIG. 9b represents a phasor diagram for the open delta design shown in FIG. 8b. The voltage across winding 301, winding 303, and winding 309 have a resultant phasor in respective directions of rotation indicated by the reference numerals 901 and 902. The resultants 901 and 902 are equal to one another.

Figure 10A:
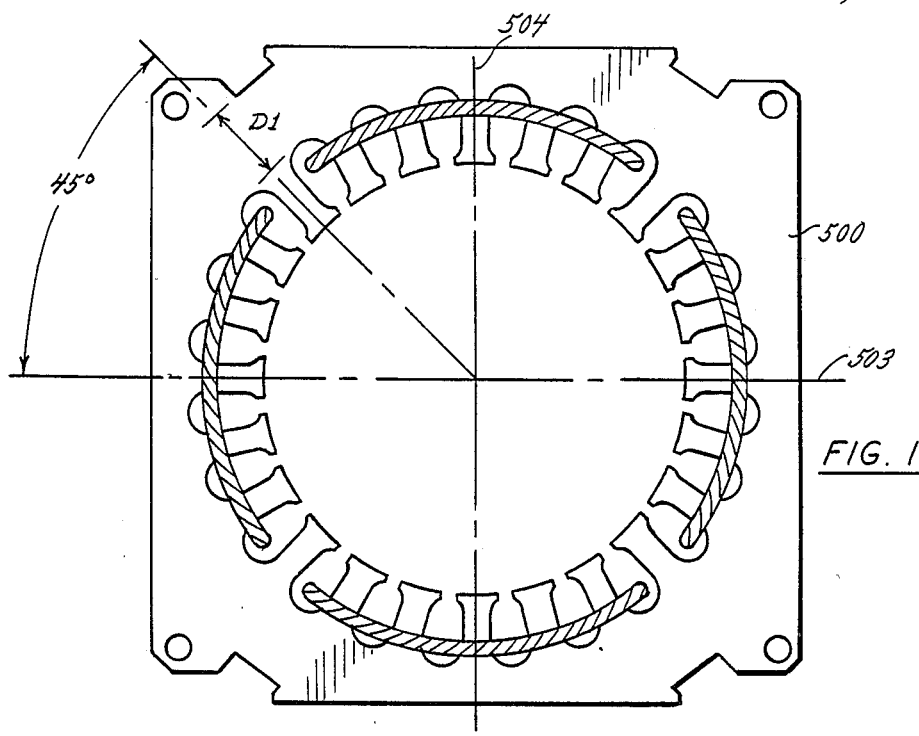
FIGS. 10a and 10b are diagrammatic views showing respective first (10a) and third (10b) windings acting as main windings for an open delta arrangement in a prior art lamination design, further illustrating first and second yoke areas of maximum flux density.
Figure 10B:
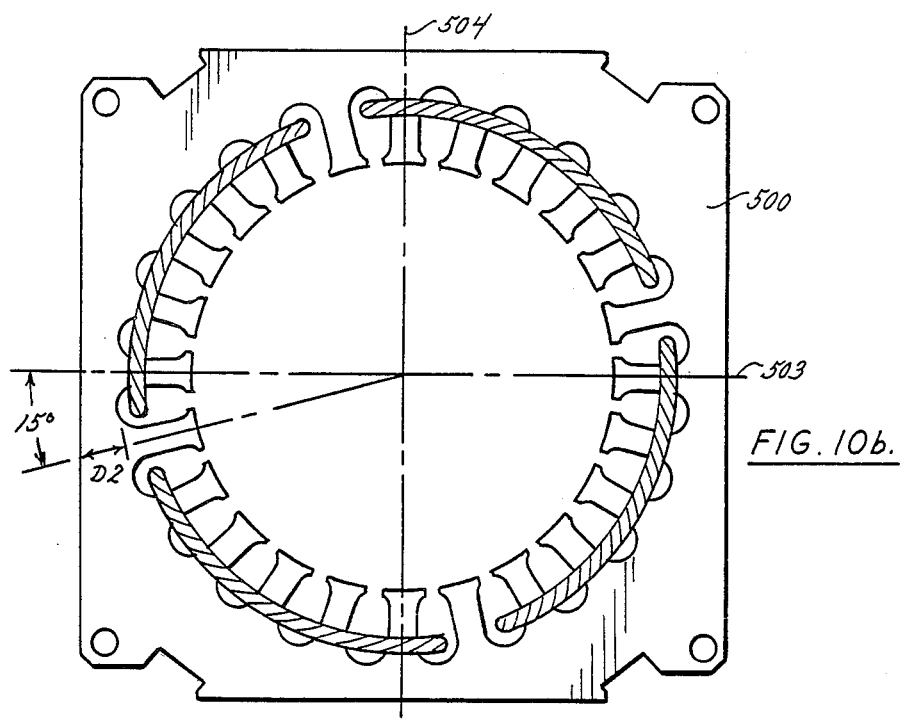
Figure 11A:
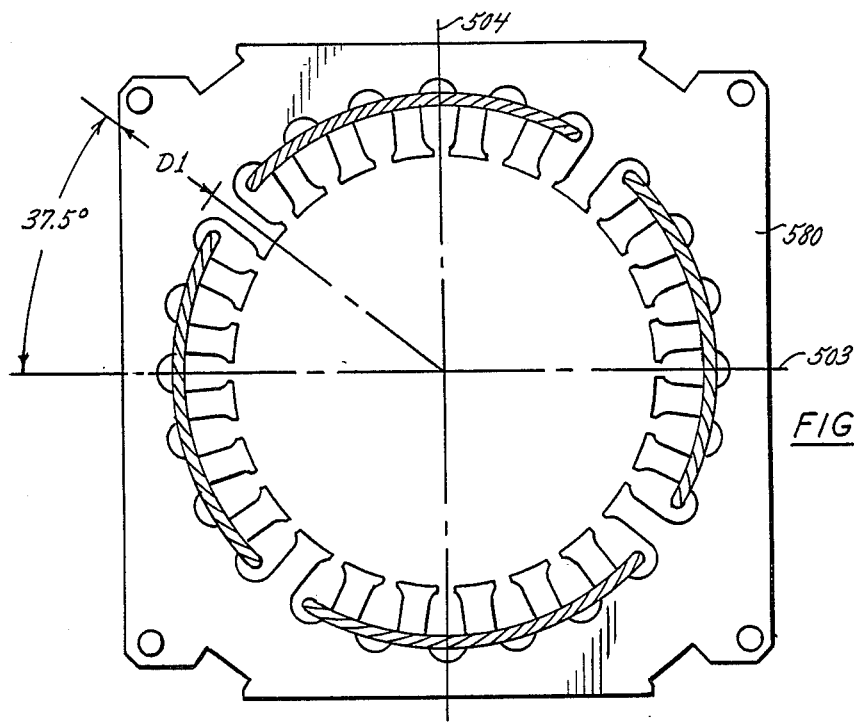
FIGS. 11a and 11b are diagrammatic views of first (11a) and third (11b) windings acting as main windings for an open delta arrangement of the motor of this invention, illustrating the availability of yoke portions having approximately equal flux densities in each direction of motor rotation employing the motor design of this invention.
Figure 11B:
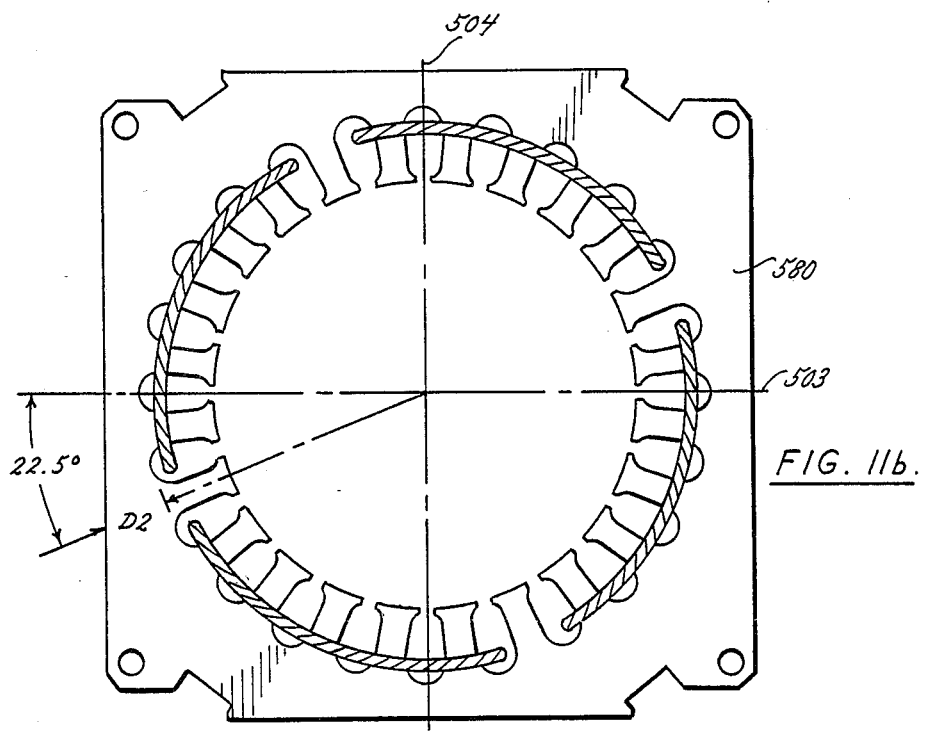

Performance of the open delta design caused by placement of windings in the lamination 580, while not exactly equal as is the case of embodiment shown in FIGS. 7a and 7b, is comparable to the improved results obtained by shifting the two windings in the prior art designs. Thus, while FIGS. 10a and 10b show two different windings with relatively large differences in yoke area and consequently flux densities, the relationship illustrated in FIGS. 11a and 11b, with one winding split at 37.5° (FIG. 11A) and the other winding split at 22.5° (FIG. 11B), tends to minimize the difference. Specifically, in order to minimize the differences in yoke area with consequent larger flux densities, FIG. 11a shows a first winding in an open delta arrangement where the winding split is located at 37.5 degrees, while FIG. 11b shows a third winding in an open delta arrangement where the winding split is located at 22.5°, thereby minimizing the difference in the yoke area and flux densities. That is to say, while the distance $D_1$ "is somewhat greater than distance $D_2$" in FIGS. 11a and 11b respectively, overall motor cost may justify the difference in performance. I have found consequently, that either winding design may be employed advantageously with the lamination design 580. With either embodiment described, it is desirable to attempt to balance the maximum flux densities in each direction of rotation to ensure proper washability in washing machine applications, and to ensure improved electrical performance in other applications.

Numerous variations, within the scope of the appended claims, will be apparent to those skilled in the art in view of the foregoing description and accompanying drawings Thus, while cleating was described as the preferred method of core manufacture, bonding, welding or combinations of the three, or other methods may be employed if desired. The motor is shown using a construction in which the end shields are mounted directly to an end face of a particular lamination. Other constructions may be employed For example, more conventional motor shell and end shield arrangements may be used. Lamination thicknesses and relative dimensions may change in other embodiments of this invention. As indicated, the number of poles and the number of coils comprising the poles may also vary. These variations are merely illustrative.

Having thus described the invention, what is claimed and desired to be secured by Letters Patent is:

1. A reversible permanent split capacitor motor comprising:
a stator assembly including a core having a generally parallelogram silhouette, said core being constructed from a plurality of stator laminations, each of said laminations having said silhouette, said core having a central opening defining a rotor receiving bore therein, and a plurality of radially extending receptacles opening onto said bore and defining winding receiving slots, said slots defining a plurality of teeth the radial inner extension of which defines said bore, and windings in said slots, said windings including at least a first winding and a second winding each having circumferentially spaced winding splits, said windings being electrically connectable so that said first winding delimits a main motor winding in a first direction of rotation and an auxiliary motor winding in a second direction of rotation, while said second winding delimits and auxiliary motor winding in said first direction of rotation and a main motor winding in said second direction of rotation, each winding being operatively placed in said stator so that the maximum flux density in said core in the area of said winding splits is approximately equal in either direction of rotation of said motor;
rotor mounted for rotation in said bore; and
support means for said rotor operatively connected to said rotor and said stator.

2. The motor of claim 1 further including a capacitor, said capacitor being electrically connected to one side of said first and said second windings.

3. The motor of claim 1 and further including a third winding placed int he lamination slots of said stator assembly and a capacitor, said capacitor being electrically connected to said third winding and one of said first and said second windings.

4. The motor of claim 1 wherein each lamination has twenty-four slots, four peripheral flat surfaces arranged in the parallelogram shape, and two axes of symmetry along opposite paris of said flat surfaces of said parallelogram shape, said teeth being offset at each of said axes, said winding including a plurality of poles, each pole being split with respect to an adjacent pole, said winding being places in said core so that at least tow splits between windings are symmetrical with respect to said axes.

5. The motor of claim 4 wherein the split of said windings for each pole is $22\frac{1}{2}°$ from one of said axes.

6. The motor of claim 4 wherein the split between winding poles occurs at $37\frac{1}{2}°$ in one direction of rotation and $22\frac{1}{2}°$ in a second direction or rotation.

7. The motor of claim 4 in which said stator assembly has an inner diameter of not less than 2.70 inches.

8. The motor of claim 7 where said stator assembly has a determinable impedance value, and the resistance of the rotor is a value selected from a range of between 1.25 to 1.55 times the impedance value of said stator assembly.

9. A reversible permanent split capacitor motor comprising:
a stator assembly including a core having a predetermined silhouette, said core being constructed from a plurality of stator laminations formed from suitable magnetic material, each of said laminations having identical silhouettes to form said core silhouette, said core having a central opening defining a rotor receiving bore therein, and a plurality of readily extending receptacles opening onto said bore and defining winding receiving slots, said slots defining a plurality of the teeth, the radial inner extension of said teeth defining said bore, and windings in said slots, said windings including at least a first winding and a second winding each having circumferentially spaced winding splits, said windings being electrically connectable so that said first winding delimits a main motor winding in a first direction of rotation and an auxiliary motor winding in a second direction of rotation, while said second winding delimits an auxiliary motor winding in said first direction of rotation and a main rotor winding in said second direction of rotation, each winding being operatively placed in said stator so that the maximum flux density in said core in the area of said winding splits is approximately equal in either direction of rotation of said motor;

a rotor mounted for rotation in said bore; and support means for said rotor operably connected to said rotor and said stator.

10. The motor of claim 9 further including a capacitor, said capacitor being electrically connected to one side of said first and said second windings.

11. The motor of claim 9 further including a third winding placed in the lamination slots of said stator assembly and a capacitor, said capacitor being electrically connected to said third winding and one of said first and said second windings.

12. The motor of claim 9 wherein each lamination has twenty-four slots, four flat peripheral surfaces arranged in a parallelogram shape, and two axes of symmetry perpendicular to opposite pairs of said flat surfaces of said parallelogram shape, said teeth being offset at each of said axis, said windings including a plurality of poles, each pole being split with respect to an adjacent pole, said winding being places in said core so that at least two splits between windings are symmetrical with respect to said axes.

13. The motor of claim 12 wherein the split of said windings for each pole is $22\frac{1}{2}°$ from one of said axes.

14. The motor of claim 12 where in the split between windings poles occurs at $37\frac{1}{2}°$ in one direction of rotation and $22\frac{1}{2}°$ in a second direction of rotation.

15. The motor of claim 12 in which said stator assembly has an inner diameter of not less than 2.70 inches.

16. The motor of claim 15 wherein said stator assembly has a determinable impedance value, and the resistance of said rotor is a value selected from a range of between 1.25 to 1.55 times the impedance of said stator assembly.

17. A reversible permanent split capacitor motor comprising:

a stator assembly including a core having a predetermined configuration, said core being constructed from a plurality of stator laminations having identical silhouettes, said core having a central opening and defining a rotor receiving bore therein, and a plurality of radially extending slots opening onto said bore and defining a rotor receiving bore therein, and a plurality of radially extending slots opening slot said bore and defining winding receiving slots, said slots defining a plurality of teeth, the radial inner extension of said teeth defining said bore, and windings in said slots, said windings including at least a first winding and a second winding, said windings being electrically connectable so that said first winding delimits a main motor winding in a first direction or rotation and an auxiliary motor winding in a second direction of rotation, while said second winding delimits an auxiliary motor winding in said first direction of rotation and a main motor winding in said second direction of rotation, said stator assembly winding having a predetermined electrical impedance value;

a rotor mounted for rotation in said bore, said rotor having a squirrel cage design the resistance value of which is selected from a range of between 1.25 to 1.55 times the predeterminable impedance value of said stator assembly winding; and support means for said rotor operably connected to said rotor and said stator.

18. The motor of claim 17 wherein each winding has winding splits about said slots and is operatively placed in said stator so that the maximum flux density in said core in the area of said winding splits is approximately equal in either direction of rotation of said motor.

19. The motor of claim 18 in which the bore of said stator assembly has a diameter of not less than 2.70 inches.

20. The motor of claim 19 further including a capacitor, said capacitor being electrically connected to one side of said first and said second winding.

21. The motor of claim 20 wherein each of said laminations has twenty four slots, four peripheral flat surfaces arranged in a parallelogram shape, and two axes of symmetry along said flat surfaces, said teeth being offset at each of said axes, said windings including a plurality of poles, each being placed in said core so that at least two splits between windings are symmetrical with respect to said axes.

22. The motor of claim 21 wherein the split of said windings for each pole is $22\frac{1}{2}°$ from one of said axes.

23. The motor of claim 21 wherein the split between winding poles occurs at $37\frac{1}{2}°$ in one direction of rotation and $22\frac{1}{2}°$ in a second direction of rotation.

24. The motor of claim 23 wherein said motor further includes a third winding placed in the lamination slots of said stator assembly and a capacitor, said capacitor being electrically connected to said third winding and one of said first and said second windings.

* * * * *

UNITED STATES PATENT AND TRADEMARK OFFICE
CERTIFICATE OF CORRECTION

PATENT NO.   : 4,886,990
DATED        : December 12, 1989
INVENTOR(S)  : Alan R. Barker It is certified that error appears in the above-identified patent and that said Letters Patent is hereby corrected as shown below:

Column 1, in the Title of the Invention, "REPTITION" should be --REPITITION--.

Column 1, Line 68, "matching" should be --machine--.

Column 4, line 67, ":8" should be --18--.

Column 6, line 36, "skilled in the will" should be --skilled in the art will--.

Column 9, line 15 "and the other winding split at 22.5° (FIG. 11B), tends to minimize the difference." should be --and the winding split of a second winding at 22.5° (FIG. 11B), tends to minimize the difference.--.

Column 10, line 19, "placed int he" should be --placed in the--.

Signed and Sealed this

First Day of October, 1991

Attest:

HARRY F. MANBECK, JR.

Attesting Officer

Commissioner of Patents and Trademarks